3,466,735
BONDING OF SILVER-CADMIUM OXIDE BODIES
Kenneth L. Emmert, Wethersfield, Conn., assignor to Contacts, Inc., a corporation of Connecticut
No Drawing. Filed Jan. 23, 1967, Ser. No. 616,998
Int. Cl. B23k 1/20
U.S. Cl. 29—472.9     6 Claims

ABSTRACT OF THE DISCLOSURE

Silver-cadmium oxide bodies are well known as electrical contacts, but are notoriously difficult to bond to supporting members. It has now been discovered that preparation of the bonding surface with a dilute aqueous cyanide solution overcomes this problem. Preferably, the surface is additionally treated with a silver strike solution or silver plated and heat treated, prior to brazing by conventional techniques. Contacts bonded in this manner have greatly improved shear strength.

BACKGROUND OF THE INVENTION

The present invention relates generally to the bonding of silver-cadmium oxide bodies to other metals or alloys and, more particularly, the invention relates to the preparation of the bond surface of a silver-cadmium oxide body prior to bonding. The method of the invention is particularly useful in the bonding of silver-cadmium oxide electrical contact elements to supporting members made of other materials.

Electrical contacts of silver and cadmium oxide are, under normal operating conditions, suitable for repetitive make-and-break type applications, because they have good conductivity, and do not weld or stick upon repeated opening and closing. They also have a high resistance to wear and low loss of material per operation. Such bodies usually contain from 5 to 25% CdO, and may contain minor amounts of other metals.

Satisfactory brazes of such contact compositions have been difficult to achieve by prior art methods. Such methods involved coating one or more of the component parts with various types of flux, and then placing a silver brazing alloy between or immediately adjacent the surfaces of the parts which it was desired to braze, and subsequently heating all of these to or somewhat above the melting and/or flow point of the silver brazing alloy. In order not to reduce the cadmium oxide content to cadmium, this heating is usually performed in air, or in a substantially non-reducing atmosphere, such as nitrogen.

The silver alloy brazing materials only partially "wet" or penetrate the cadmium oxide portions of the silver-cadmium oxide bodies. This often results in the brazed assemblies failing when subjected to the mechanical stresses accompanying their normal use. Moreover, the electrical conductivity is generally much lower than desirable.

Many added, often expensive, operations have been used in an effort to overcome these detrimental factors. Among the better known of these are the use of various acids or solutions for leaching out the cadmium oxides in the face to be brazed, previously cladding the silver-cadmium oxide brazing surface with a protective thickness of silver, electroplating or metallizing of the silver cadmium surfaces with silver, and preventing oxidation of the silver-cadmium oxide surface to be brazed, when the silver-cadmium oxide is produced by internal oxidation.

When the silver-cadmium oxide bodies are joined to a support by a soft solder which is applied in the normal melting range of about 300° F. to 600° F., a weak mechanical bond often results. Great care must be taken to see that the working (electrically operative) surfaces of these assemblies are not contaminated with lead, tin or the like from the soft solders and/or fluxes usually used with them.

Two other methods of overcoming this problem are worthy of mention. In the first, the surface of the silver-cadmium oxide body to be bonded is subjected to a "tinning" or "solder flushing" operation wherein a 50–80% Sn solder is caused to diffuse thereinto. A conventional silver brazing alloy is then used to make the bond. In the second method, the contact is produced with a sheath or covering of a silver-cadmium alloy. The latter material brazes easily and, after the bond is made, the cadmium is oxidized by well known techniques. While both of these methods produce bonds of reasonably good strength and conductivity, they are inherently expensive due to the additional steps that are necessary.

OBJECTS OF THE INVENTION

It is a general object of the present invention to provide an improved method of bonding silver-cadmium oxide bodies to supports.

Another object of the present invention is to provide an effective method of directly bonding silver-cadmium oxide bodies to supports.

Still another object of the present invention is to provide a novel method of preparing silver-cadmium oxide surfaces for bonding.

Yet another object of the invention is to provide a method of bonding silver-cadmium oxide bodies to supports which produces more reliable bonds and which is more economical than methods used heretofore.

A further object of the invention is to provide a method of bonding silver-cadmium oxide bodies to supports which produces bonds having greatly improved shear strength.

Various other objects and advantages of the invention will become clear from the following detailed description of several embodiments thereof, and the novel features will be particularly pointed out in connection with the appended claims.

SUMMARY OF THE INVENTION

The essence of the invention resides in the immersing or washing of the silver-cadmium oxide surface to be bonded with a dilute aqueous potassium or sodium cyanide solution. It has been discovered that contacts treated in this way will braze readily to base materials with conventional brazing alloys and procedures. It is preferred, however, to place a very thin coating of silver on the surface after the cyanide treatment and then heat treat the element. The silver layer can be applied by plating techniques from a silver strike solution or by conventional electroplating. The heat treatment is carried out at 1200° to 1400° F. to from ½ to 24 hours. Bonds produced in this manner have about 5 times the shear strength of bonds made without this pretreatment.

DESCRIPTION OF EMBODIMENTS

The use of cyanide solutions as an etchant for silver and silver alloys has been known for many years, and is a standard technique for preparing specimens of such alloys for metallographic examination. Thus, a 5% KCN solution is recommended as an electrolytic etchant for silver, and equal parts of a 5% KCN and 5%

$$(NH_4)_2S_2O_8$$

solutions are recommended for ordinary chemical etching of silver.

One would not ordinarily expect a reagent known to attack silver to also attack a relatively refractory oxide such as CdO. In fact, one would expect that a known silver etchant, when applied to an 80% Ag-20% CdO composite body, would preferentially attack the silver and leave CdO "hills" surrounded by silver "valleys." The net effect would be the exposure of more CdO than was present in the original surface. Since it is the presence of CdO which makes bonding difficult in the first instance, one would thus tend to avoid known silver etchants in this service.

What in fact occurs when a cyanide solution is used on a silver-cadmium oxide surface is quite the contrary. While the solution attacks the silver as expected, it apparently also attacks the cadmium oxide preferentially, because the resulting surface is not only bright silver but is free of cadmium oxide. In this condition a strong bond can be formed on the surface by conventional brazing techniques.

The mechanism of reaction between the cyanide and the oxide is not known. It may reduce the oxide to cadmium cyanide ($CdCN_2$) in solution, or convert it to metallic cadmium which plates out on the adjacent silver surface. Whatever the mechanism, the net effect is that an oxide-free surface is presented, which is what is needed to produce a good bond.

The composition of the solution used for carrying out the invention is not critical, but is preferably dilute. Thus, it is preferred to dissolve from ½ ounce to 8 or more ounces of an alkali metal cyanide, such as potassium or sodium cyanide, in a gallon of warm water. Four ounces to the gallon produces a solution of readily controllable activity and is preferred.

The silver-cadmium oxide body can be immersed in the solution, or the surface thereof to be bonded can be washed or coated with the solution. At a solution concentration of 4 ounces cyanide per gallon of water, a contact time of 5-10 min. is sufficient to bring about the desired results.

Alternatively, the treatment with the cyanide solution may be electrolytic. In this instance, the silver-cadmium oxide contact is made the anode. The current, AC or DC but preferably the latter, is supplied with a suitable cathode at a voltage of from 2 to 48 volts and a power density of from about ½ to 20 amperes per square foot of surface being treated. Under these conditions, treatment lasting 10 minutes is satisfactory.

The treated body is rinsed and dried in air, and is ready to be brazed. Any of the well known silver brazing alloys can be used. For example, the alloy sold under the trademark "Easy-Flo 45" by the Handy and Harmon Company, and which contains 45% Ag, 15% Cu, 16% Zn and 24% Cd is most satisfactory. The alloy is placed between the surfaces to be bonded on the contact and the support, and the assembly is heated in a non-reducing atmosphere to a temperature somewhat above the minimum flow point of the brazing alloy. With the alloy noted above, the flow point is 1145° F. The choice of a particular brazing alloy will depend on the support material involved (ferrous or nonferrous) and those skilled at brazing will make an appropriate choice.

Any of the known silver brazing alloys will wet the prepared silver surface of the silver-cadmium oxide contact without difficulty, and the resulting bond shows excellent strength in shear or peel tests and has a low resistance.

While bonds made on the cyanide treated surfaces are much better than bonds made without such treatment, even further improvement in bond strength can be achieved by applying a very thin layer of silver to the cyanide-treated surface, followed by a heat treatment of the contact, prior to bonding.

The layer of silver can be applied with a conventional silver strike solution, comprising 10 to 12 ounces of KCN and 0.25 to 0.50 troy ounces of silver as silver cyanide, dissolved in one gallon of water. The contacts are again the anode of the circuit, and a treatment time of from 1 to 10 minutes is satisfactory. Such a treatment deposits a layer of silver only several thousand angstroms in thickness.

The layer of silver can also be applied by use of conventional plating baths, controlled to deposit a layer no thicker than 0.002 inch, and preferably about 0.005 inch. Plating techniques are well known and need not be discussed in detail herein.

It is to be noted that silver cladding has been proposed heretofore for silver-cadmium oxide contacts, but without the cyanide solution pretreatment disclosed herein such clad bodies have a tendency to delaminate under shear stress. Further, conventional cladding of silver-cadmium oxide bodies is not feasible at combined thicknesses under about 0.05 inch, some twenty-five times thicker than the maximum silver coating taught herein.

The silver-cadmium oxide contact having the thin silver layer on the bond surface, applied by either of the above-noted methods, is then heat treated at about 1200° to 1400° F. in air for from ½ to 24 hours. The heat treatment is believed to have two functions. First, it is thought to improve the bond between the applied silver layer and the underlying silver substrate. The heat treatment may also cause silver in the applied layer to penetrate the underlying silver substrate along the grain boundaries and around the cadmium oxide inclusions. Whatever the actual mechanism, the resulting surface produces remarkably strong bonds of low electrical resistance.

Brazing of the contacts to their supports is carried out in the same manner as described above.

Understanding of the invention will be further facilitated by referring to the following specific example, wherein data on comparative tests between contacts prepared by conventional procedures and contacts prepared by the technique of the present invention are set forth.

EXAMPLE

A large number of discs of 90% Ag-10% CdO were prepared by well-known internal oxidation techniques. It was desired to bond these discs to copper rivets having heads of equal diameter to the discs.

Half of the discs were bonded to the rivet heads by conventional techniques, that is, without any pretreatment of the disc.

The other half were prepared and bonded in accordance with the present invention, some with just the cyanide solution treatment prior to brazing and some with the additional layer of silver and the heat treatment prior to brazing.

Half of each group of contacts were then subjected to the following test. Each contact was placed in a vise with the silver-copper (i.e. brazed) interface at right angles to the jaws. The jaws were then tightened until the rivet head diameter had been compressed down to the diameter of the shank of the rivet. The conventionally-prepared contacts separated at the brazed interface, usually after only a fraction of the full compression, and in every instance they split by the time full compression to the shank diameter was reached. All of the contacts prepared in accordance with the present invention withstood the full compression without any separation or cracking.

The remaining contacts were subjected to the following test. Each contact was mounted in a suitable jig, and a sharp chisel, having a V-shaped edge, was placed with its edge against the contact along the braze line. The distal end of the chisel was struck a sharp blow with a 3 pound hammer swung through a one foot arc.

The contacts prepared by prior art methods separated without exception after from one to three of such blows. Contacts made in accordance with the present invention required a minimum of seven blows to separate, and in most instances ten or more blows were required.

In this series of tests it was noted that the contacts which had the silver coating and heat treament gave generally superior results over those which were brazed directly after the cyanide solution treatment.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. A method for bonding a silver-cadmium oxide body to a support comprising:
   (a) contacting the surface of said body to be bonded with a dilute aqueous alkali metal cyanide solution;
   (b) inserting a silver brazing alloy between said cyanide-treated surface and said support; and
   (c) heating said body, alloy and support to a temperature above the flow temperature of said alloy.

2. A method for bonding a silver-cadmium oxide body to a support comprising:
   (a) contacting the surface of said body to be bonded with a dilute, aqueous alkali metal cyanide solution;
   (b) applying a very thin silver coating to said cyanide treated surface;
   (c) heating said body to a temperature of from about 1200° F. to about 1400° F. for from about ½ to 24 hours;
   (d) inserting a silver brazing alloy between said silver-coated surface and said support to form an assembly; and
   (e) heating said assembly to a temperature above the flow temperature of said alloy.

3. The method as claimed in claim 2, wherein said silver coating has a maximum thickness of 0.002 inch, and is electrolytically deposited from a silver strike solution.

4. The method as claimed in claim 2, wherein said silver coating has a maximum thickness of 0.002 inch, and is electroplated on said surface.

5. The method as claimed in claim 2, wherein said solution contains from ½ to 8 ounces of sodium or potassium cyanide per gallon of water.

6. The method as claimed in claim 2, wherein step (a) is carried out with said body as the anode of an electrolytic circuit.

References Cited

UNITED STATES PATENTS

| | | | |
|---|---|---|---|
| 3,078,562 | 2/1963 | Gwyn et al. | 29—473.1 |
| 3,100,338 | 8/1963 | Henry | 29—488 XR |
| 3,137,586 | 6/1964 | Pry | 29—473.1 XR |
| 3,151,385 | 10/1964 | Gwyn | 29—472.9 XR |
| 3,296,034 | 1/1967 | Reich | 29—473.1 XR |

JOHN F. CAMPBELL, Primary Examiner

R. B. LAZARUS, Assistant Examiner

U.S. Cl. X.R.

29—473.1, 488; 287—189.365